Figure 1:
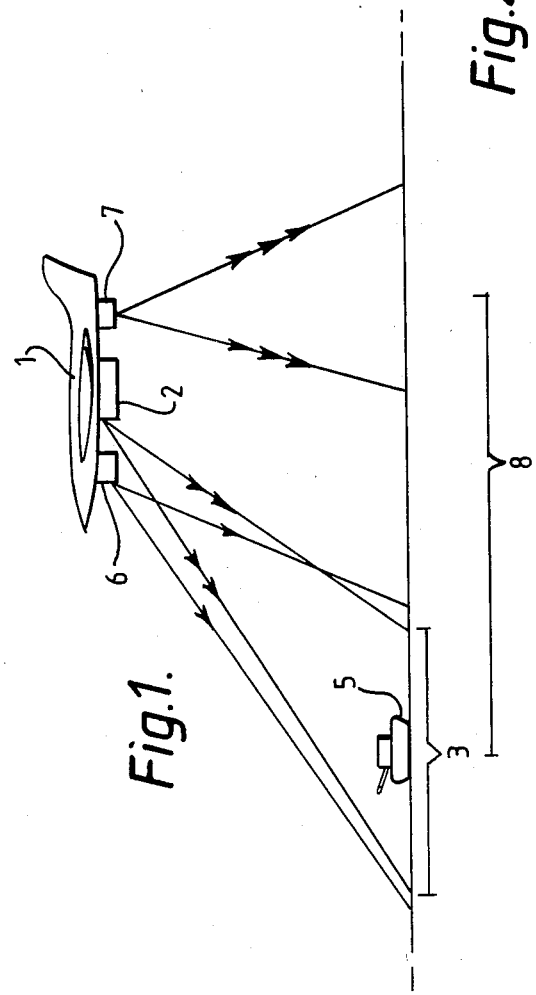

United States Patent [19]

Archdale et al.

[11] Patent Number: 4,758,850
[45] Date of Patent: Jul. 19, 1988

[54] IDENTIFICATION OF GROUND TARGETS IN AIRBORNE SURVEILLANCE RADAR RETURNS

[75] Inventors: Anthony Archdale; Julian H. Thomas, both of Preston, Great Britain

[73] Assignee: British Aerospace Public Limited Company, London, United Kingdom

[21] Appl. No.: 892,053

[22] Filed: Aug. 1, 1986

[30] Foreign Application Priority Data

Aug. 1, 1985 [GB] United Kingdom ............... 8519370

[51] Int. Cl.⁴ .............................................. G03B 29/00
[52] U.S. Cl. ..................................... 354/66; 342/190; 354/73
[58] Field of Search ................ 342/190, 191; 354/65, 354/66, 72, 73

[56] References Cited

U.S. PATENT DOCUMENTS

| | | | |
|---|---|---|---|
| 3,076,189 | 1/1963 | Goddard | 342/191 X |
| 3,375,353 | 3/1968 | Rossoff et al. | 342/191 X |
| 4,050,067 | 9/1977 | Elmore, Jr. | 342/191 |
| 4,489,322 | 12/1984 | Zulch et al. | 342/190 X |

Primary Examiner—T. H. Tubbesing
Attorney, Agent, or Firm—Cushman, Darby & Cushman

[57] ABSTRACT

A method and apparatus are described for use during testing of air-borne ground surveillance radar installations to provide positive identification of targets and other ground features in the recorded or displayed radar returns. The apparatus includes a first imaging system, such as a film camera (6), arranged to film an area (3) on the ground ahead of the aircraft (1) which is also surveyed by the surveillance radar (2), a second imaging system, such as another film camera (7), arranged to film an area on the ground directly below the aircraft and a synchronisation unit (9) operating in dependence of the aircraft's ground speed (V) and either marking or labelling the films and the radar returns or controlling the timing of operations of the camera (6 and 7) and a radar return recorder (4) so that images produced by the second camera (7) are correlated with the image and the radar return stored and recorded by the camera (6) and recorder (4) respectively to facilitate analysis of test data relating to the performance of the radar installation.

8 Claims, 1 Drawing Sheet

IDENTIFICATION OF GROUND TARGETS IN AIRBORNE SURVEILLANCE RADAR RETURNS

The invention relates to a method of apparatus for identifying features on the ground such as potential targets in the radar returns of a ground surveillance radar carried on board a moving air-borne vehicle, for example an aircraft.

During research and development of ground surveillance radar installations for use on board an aircraft, it may be useful to have available a means of positively identifying ground features in the radar return signals recorded or displayed by the surveillance installation. For example, where an aircraft has been installed with a forward looking millimetric wave (MMW) radar surveillance system under development, the system may be connected to a data recorder and the aircraft may be flown towards and over a target such as a tank for calibration and design evolution purposes. The resulting output from the surveillance system is recorded by the data recorder, and the recording is later analyzed to determine whether the target return can be distinguished from spurious signals due to noise, ground clutter and returns from non-target features. Similar trials and analysis may be performed when a new algorithm is to be tested to enable the system to automatically detect the target or distinguish between the returns from different types of target. In such situations a separate identification means for locating the position on the recording at which the target return should appear, or for providing a check that what may (or may not) have been indicated by the system as the detection of a target corresponded to a real target, would be highly desirable.

According to one aspect of the invention, there is provided a method for facilitating the identification of features on the ground in the returns of a ground surveillance system mounted on board an air-borne vehicle, including the steps of storing a first image of an area on the ground displaced from a point directly beneath the vehicle at the same time as substantially the same area is surveyed by the surveillance system, storing a second image of an area substantially beneath the vehicle, and varying the time interval between the steps of storing said first and second images in direct dependence on the ground speed of the vehicle and so that said first and second images relate to substantially the same area on the ground.

The images may be stored for example by television cameras and video recorders or by thermal imaging cameras and recorders. Preferably however the images are stored photographically by photographic cameras for example cine cameras. In the latter case two cameras may be used, the first filming an area on the ground displaced from the vehicle as it is surveyed by the surveillance system and the second filming the same area whilst the vehicle is at least substantially nearer to or directly over the area, the second camera being operated in dependence upon the ground speed of the vehicle such as to facilitate ready identification of corresponding exposed film sections from the first and the second cameras which contain views of the same portion of said area.

According to a second aspect of the invention, there is provided ground feature identification apparatus for use on board an air-borne vehicle and comprising means for storing images of respective areas of the ground, which areas are displaced from each other along the direction of travel of the vehicle and one of which is at least much nearer to or directly beneath the vehicle than the other, and further including synchronizing means which has an input for receiving data indicative of the vehicle ground speed and which is operable to ensure such operation of the means for storing images that the ready identification of corresponding ones of the stored images containing views of the same ground portions is facilitated. Again, the images may be obtained and stored by any known means e.g. television, thermal imager or photographic camera and video recorders.

Advantageously, the ground over which the vehicle moves is filmed by a first film camera aimed at a ground area displaced from beneath the vehicle along its direction of travel (usually but not essentially forwardly) and by a second film camera aimed at a ground area which is substantially directly beneath the vehicle, and whilst the films produced by the two cameras are being exposed, they are labelled with synchronizing data identifying corresponding sections of the respective films, the labelling for one of the films being controlled in dependence upon the ground speed of the vehicle.

The apparatus may further include electronic signal recording means and synchronization labels may be positioned in the record produced by the recording means to facilitate matching of that record with said films.

In use during, for example, development and testing of an MMW radar ground surveillance installation for an aircraft, the first camera and the surveillance system are arranged to view the same ground area forward of the aircraft while the second camera looks down directly beneath the aircraft. The aircraft then flies over a target with the surveillance system and cameras in operation, both films and the record of the signals from the surveillance system being labelled with synchronization data enabling them to be later matched up one to another. By way of example, successive sections of the first camera's film and the signal record could be marked with successively increasing digit values while the second camera's film is marked with the same values but displaced in time dependent on the aircraft speed so that identically marked sections of the two films contain views of the same ground area. There is thus produced easily matchable records of what was "seen" by the surveillance system, what that actually looked like from the visual point of view, and also a closer look at it from directly above it.

Figure 2:
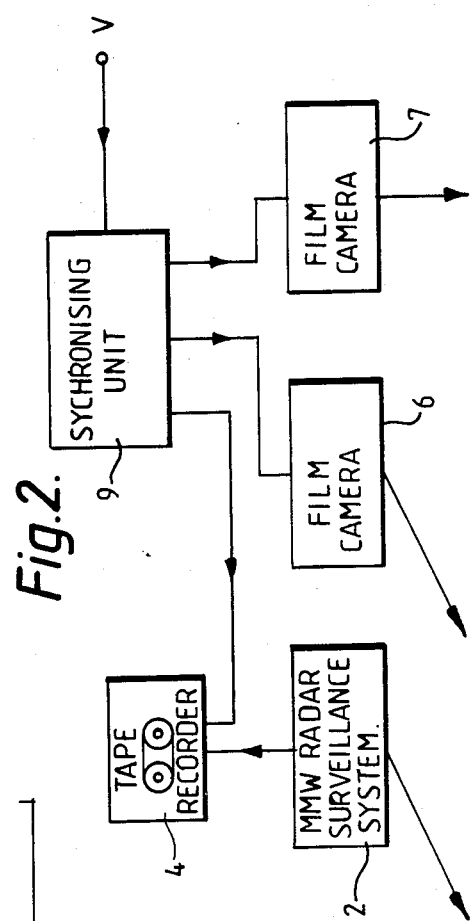

For a better understanding of the invention, reference will be made, by way of example only, to the accompanying drawing, in which:

FIG. 1 is a sketch of an aircraft carrying an MMW radar ground surveillance system and making a system test flight over a target area, and FIG. 2 is a block diagram showing a target identification system and how it is interconnected with the surveillance system.

The illustrated aircraft 1 carries a forward and downward look MMW radar surveillance system 2 which scans the ground over area 3. A video signal output from system 2 is recorded on magnetic tape by recorder 4 for later replay and analysis to see if and how the return from a target 5 can be recognized by the system 2. A first film camera 6 is mounted on the aircraft so as to film an area containing the area 3 while a second film camera 7 is mounted so as to look directly downwards.

Thus, the camera 6 "sees" the same scene as the system 2 while the camera 7 "sees" the same scene but a little later and from less distance when the aircraft has moved through distance 8 to directly over the scene. In this connection, it will be realized that FIG. 1 is compacted—distance 8 would usually be much larger in relation to the aircraft height than is shown. For example, the axis of the field-of-view of camera 6 and the axis of the field within which the system 2 scans might be only about 5° below the horizontal and the upper extremity of each field might be several degrees above the horizontal (so as to be able to survey high ground forward of the aircraft).

Each camera is of the kind which, in response to signals from synchronizing unit 9, is able to record visual synchronizing data on the exposed film. For example, the camera might label successive sections of the film, every frame perhaps, with successively increasing numbers. The unit 9 receives a signal V indicative of the aircraft ground speed and, using this, it ensures that the film produced by camera 7 is so labelled with synchronizing data that the respective sections of the two films which contain views of the same ground area can be readily correlated. Meanwhile, unit 9 also feeds synchronizing data signals to recorder 4 so that sections of the recorded tape are also labelled in synchronism with the labelling of the film produced by camera 6.

Instead of controlling the actual values of the labelling data applied to the films produced by cameras 6 and 7 and the tape recorded upon by recorder 4, the unit 9 could simply time synchronize the operation of the tape recorder and cameras appropriately. Thus, with the surveillance system operating, camera 6 and recorder 4 could be started up as the aircraft enters an area containing a pre-designated target while camera 7 is started up after an interval, determined by the aircraft ground speed, such that successive sections of the film produced by this camera contain the same views as the corresponding successive sections of the recorded tape and the film from camera 6. If required, such time synchronization of the operation of the cameras and tape recorder could be done by unit 9 in addition to controlling the actual values of the labelling data applied to the films and tape.

In any case, the ground speed signal V could be obtained from say the aircraft navigation system or it could be simply pre-entered into unit 9 manually, the pilot then taking care to fly the aircraft at the appropriate speed.

We claim:

1. A method for facilitating the identification of features on the ground in the returns of a ground surveillance system mounted on board an air-borne vehicle, including the steps of storing a first image of an area on the ground displaced from a point directly beneath the vehicle at the same time as substantially the same area is surveyed by the surveillance system, storing a second image of an area substantially beneath the vehicle, and varying the time interval between the steps of storing said first and second images in direct dependence on the ground speed of the vehicle and so that said first and second image relate to substantially the same area on the ground.

2. A method for facilitating the identification of features on the ground in the returns of a ground surveillance system as claimed in claim 1 and wherein said first and second images are stored photographically by photographic camera.

3. A method for facilitating the identification of features on the ground in the returns of a ground surveillance system as claimed in claim 2 and wherein said first image is stored by a first photographic camera filming an area on the ground displaced from a point directly beneath the vehicle and said second image is stored by a second photographic camera filming the same area whilst the vehicle is at least substantially nearer to or directly over the area, the second camera being operated in dependence upon the ground speed of the vehicle such as to facilitate ready identification of corresponding exposed film sections from the first and the second cameras which contain views of the same portion of said area.

4. A method for facilitating the identification of features on the ground in the returns of a ground surveillance system as claimed in any of the preceding claims and further including the step of marking or labelling corresponding ones of the said first and second stored images with marks or labels denoting the correspondence thereof.

5. A method for facilitating the identification of features on the ground in the returns of a ground surveillance system as claimed in claim 4 and further including the step of marking or labelling a recording of the returns of the ground surveillance system at points corresponding to the said first and second stored images of areas on the ground marked or labelled to denote the correspondence thereof.

6. Ground feature identification apparatus for use on board an airborne vehicle comprising means for storing images of respective areas of the ground, which areas are displaced from each other along the direction of travel of the vehicle and one of which is at least much nearer to or directly beneath the vehicle than the other, and further including synchronizing means having an input for receiving data indicative of the ground speed of the vehicle and which is operable to ensure such operation of the means for storing images that the ready identification of corresponding ones of the stored images containing views of the same ground portions is facilitated.

7. Ground feature identification apparatus as claimed in claim 6 and wherein the synchronizing means comprises means to control the means for storing images so as to delay the storing of an image corresponding to the area nearer to or directly beneath the aircraft with respect to the storing of images corresponding to the other areas by a time directly proportional to the vehicle's ground speed.

8. Ground feature identification apparatus as claimed in claim 6 and wherein the synchronizing means comprises means to control marking or labelling means so as to apply marks or labels to said corresponding ones of the stored images to denote the correspondence thereof.

* * * * *